May 29, 1962

E. WALHOF ET AL 3,036,688

CONVEYOR

Filed March 12, 1959

INVENTORS
PETER A. WALHOF
JOHN B. WALHOF
ELMER WALHOF

BY

ATTORNEYS

May 29, 1962   E. WALHOF ET AL   3,036,688
CONVEYOR
Filed March 12, 1959
2 Sheets-Sheet 2
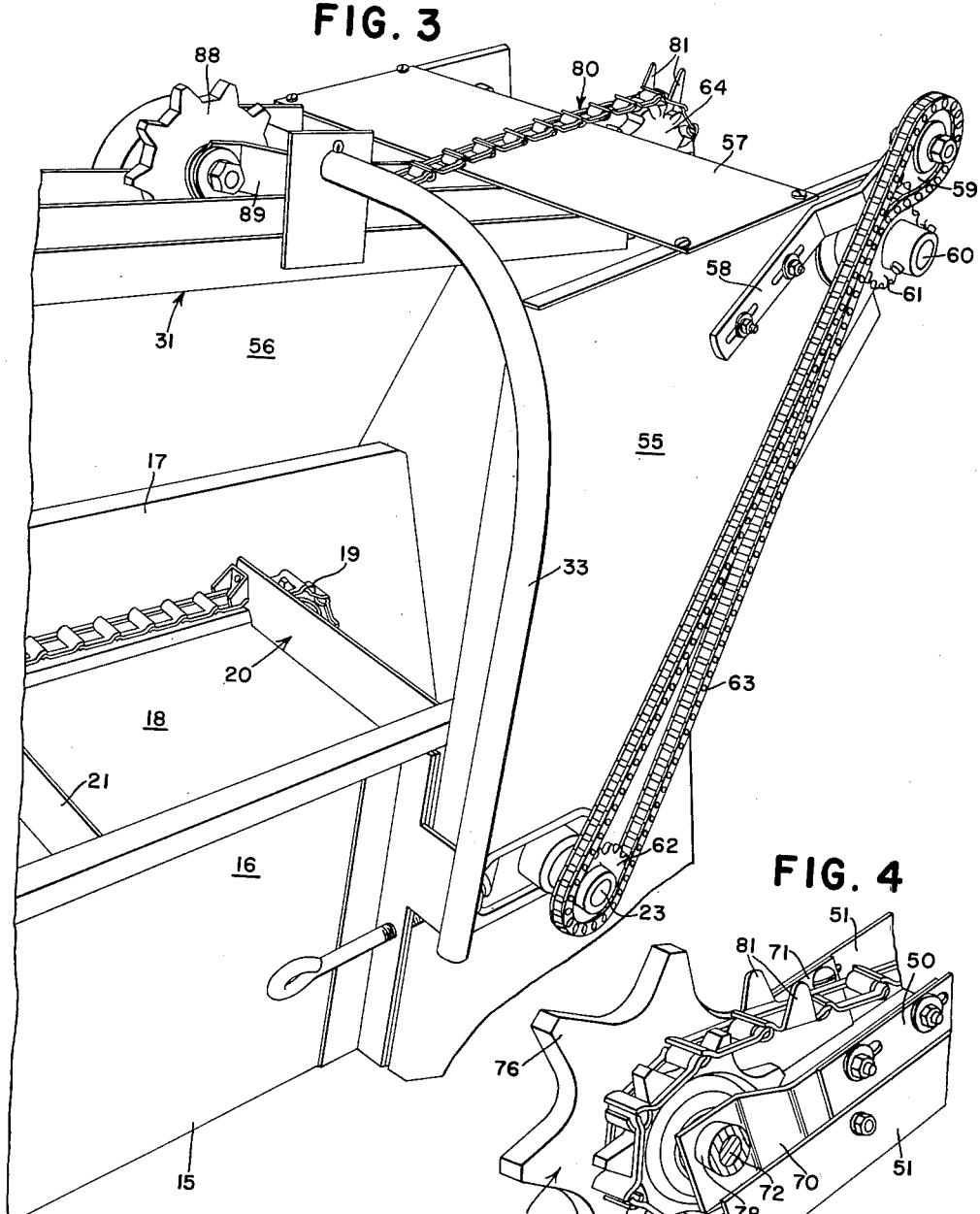
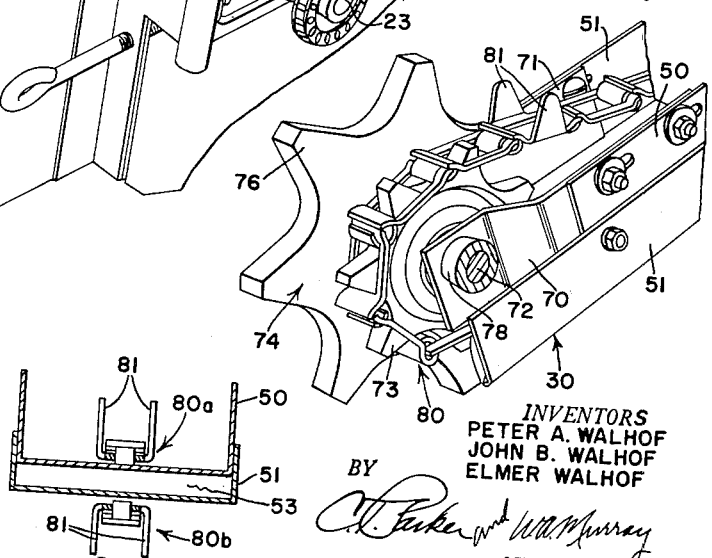
INVENTORS
PETER A. WALHOF
JOHN B. WALHOF
ELMER WALHOF
BY
ATTORNEYS United States Patent Office 3,036,688
Patented May 29, 1962

3,036,688
CONVEYOR
Elmer Walhof, John B. Walhof, and Peter A. Walhof, Edgerton, Minn., assignors to Deere & Company, Moline, Ill., a corporation of Delaware
Filed Mar. 12, 1959, Ser. No. 798,974
10 Claims. (Cl. 198—7)

This invention relates to an article-handling machine and more particularly to a conveying apparatus for elevating articles such as bales of hay or straw from the ground to a higher level. More specifically, the invention relates to means for use on a bale loader or elevator for preventing retrograde movement of the bales as they are being elevated.

Bales of hay or straw as formed by conventional balers may be either cylindrical or of elongated block form. In either case, the length of such bale materially exceeds its width by about two to one. As any farmer will readily attest, a bale is one of the most difficult articles to handle, because it is fairly heavy, bulky and at times annoyingly unwieldy.

Baled hay or straw, like the same material in bulk, is customarily stored in quantity in lofts, and various devices have been used or proposed for accomplishing the elevation of the material from the ground to such lofts. More recently, the conventional grain elevator has been used for this purpose, it being found that the usual elevator, particularly one of the larger sizes, has sufficient capacity to elevate the bales. A conventional elevator of the type referred to comprises an elongated trough or ramp inclining from a lower receiving end to an upper discharge end. An endless conveyor runs in the trough for moving material from the receiving end to the discharge end. These elevators operate efficiently in the handling of corn or grain, which is relatively fluent, and it is ordinarily immaterial at what angle of elevation these machines operate. However, in the elevation of bales of hay or straw, different problems arise. The most serious problem is the tendency of the bales, when the elevator is operated at an extreme angle, to roll end over end down the elevator. The bales are loaded into the elevator so that their length lies along the length of the trough and, since the flights on the endless conveyor are designed primarily for grain, the bales are rather precariously held in the trough. Accordingly, it is expedient to provide some form of means running above the elevator for holding the bales downwardly against the endless conveyor so that they cannot roll or turn end over end down the trough.

However, there is another acute problem involved. This occurs in the initial loading of the bales into the trough. Conventionally, the bales are brought from the field on a flat-bed trailer or truck and must be manually dropped from the trailer or truck to the lower level of the receiving end of the elevator. Since the endless conveyor is constantly moving upwardly, the tendency of the conveyor is to seize the lower end of the bale and start it upwardly before the operator has a chance to release his hold on the bale. This initially imparts a rotating movement to the bale about its minor axis and, before the bale even has a chance to start upwardly on the conveyor, it begins to roll downwardly and interferes with the loading of the succeeding bale. Of course, the problem can be eliminated to a large extent by the exercise of care and patience on the part of the operator; but, like anything else, requirements of this nature increase the already onerous burden on the operator. Therefore, it is desirable to provide for accommodating the problem so that the bales may be speedily and rather randomly loaded into the elevator.

According to the present invention, improved bale-handling means is provided, either as an attachment for existing elevators or as part of a machine designed especially for the handling of bales. In either case, the principles of the invention are equally applicable. What is involved is the utilization of a series of longitudinally spaced supports mounted on the elevator trough including a support at the bale discharge end of the trough, a support at the bale receiving end of the trough, and a support intermediate the ends of the trough. The supports carry in depending relation a longitudinally extending guide positioned above the conveyor and the elevator trough a height substantially equal to the width of a bale. The guide is composed of a first elongated rigid section extending between and supported by the intermediate support and the discharge end support and a second rigid elongated section continuing downwardly from and mounted in pivotal relation to the end of the first section. The lower end of the second section is carried on and extends downwardly beyond the bale-receiving end support. The means mounting the lower or second section on the lower support is biased downwardly to permit the lower end of the section to move vertically toward or away from the conveyor trough. Consequently, bales may be indiscriminately passed under the guide section either on end or on their sides and the lower or second section operates to cause the bales to lay properly in the trough.

It is further proposed as a part of this invention to provide a continuously operating chain to be mounted on the guide sections and extending from the lower end of the lower section to the upper end of the upper section. The chain is provided with lugs which depend from the lower run and engage the bales moving between the guide and the trough. The chain receives its power from the upper end of the upper guide section and directly from the conveyor in the elevator trough.

It is a further proposal of this invention to provide a pair of rotating wheels at the lower end of the second or lower section of the guide which for practical purposes will be mounted on the shaft carrying the chain sprocket. The wheels will have radially extending fingers which will tend to engage the bales at the receiving end of the elevator and to guide them into the trough. The wheels will be driven by the chain on the guide. The bales will therefore be driven from their upper and lower surfaces from the point of entry in the elevator trough so that tumbling will be almost entirely eliminated and the bales will be discharged from the elevator in a comparatively solid or unbroken condition.

Other objects and advantages of the present invention will become apparent to those skilled in the art as the nature of the invention is better understood following the disclosure herein set forth and as shown in the accompanying drawings.

FIG. 3 is a side and forward perspective view of the upper end of the elevator.

FIG. 4 is a view somewhat similar to FIG. 2 with portions removed to show internal mechanism.

FIG. 5 is a sectional view taken substantially along the line 5—5 of FIG. 1.

As stated above, the principles of the invention are equally applicable whether the arrangement embodying the same is utilized as an attachment for existing elevators or as part of a specially designed machine for handling bales. Accordingly, the present disclosure is to be taken as representative only and not as supporting the importation of limitations on the scope of the invention. Further, the use of such expressions as "bottom," "top," "length," "width," etc., is for convenience only, due regard being had to the various equivalent possibilities that will readily occur from the disclosure.

Figure 1:
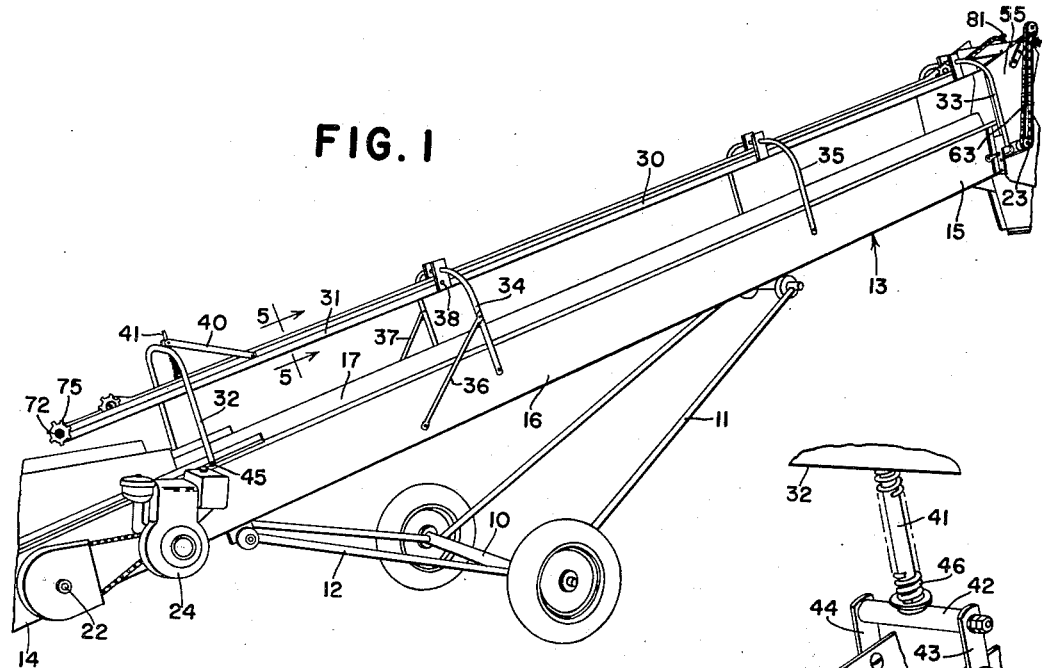
FIG. 1 is a side perspective of an elevator incorporating the structure of the present invention.
Figure 2:
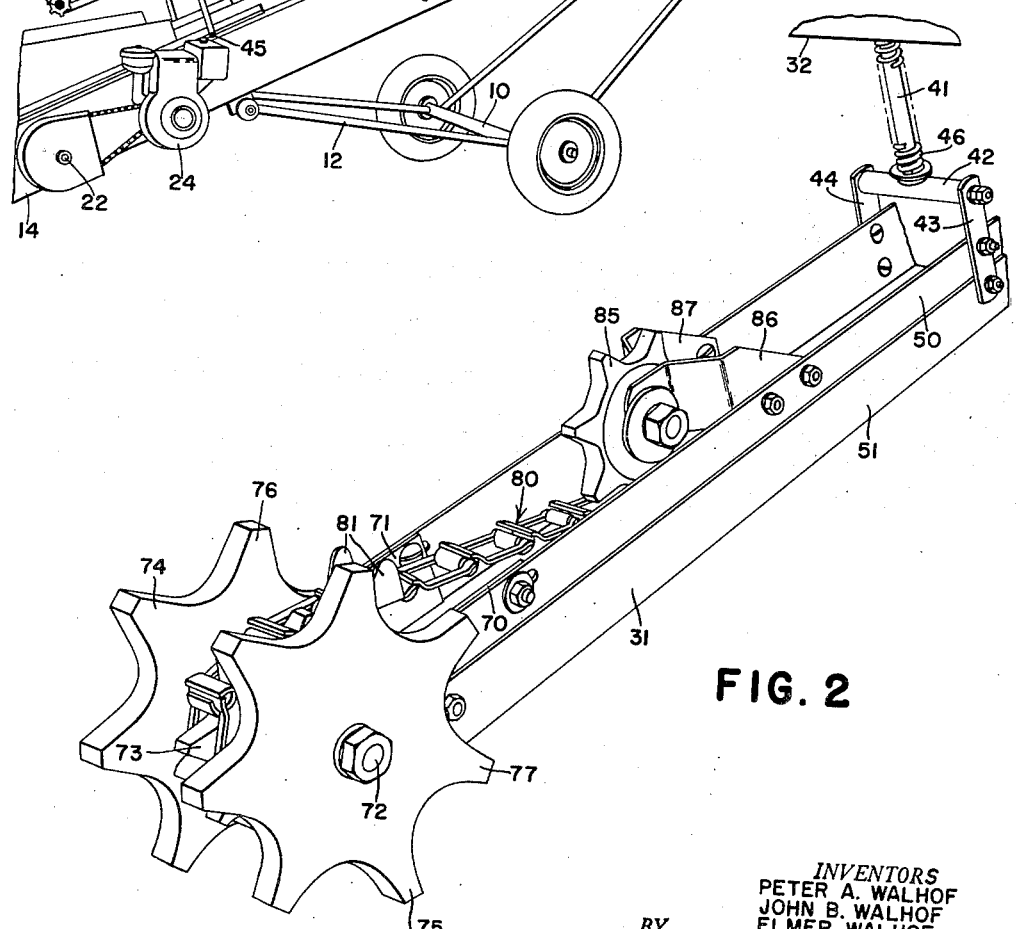
FIG. 2 is a side and forward perspective of the lower end of the guide and chain mechanism.

FIGURE 1 best shows the overall picture. The elevator chosen for the purposes of illustration comprises a transverse wheeled axle 10 with a reach 11 and a mast 12. Trough or ramp means 13 is supported on the mast and reach and inclines from a lower bale-receiving end 14 to an upper bale-discharge end 15.

The upper portion of the trough or ramp means 13 comprises a pair of transversely spaced apart, elongated parallel sides 16 and 17 cross-connected by a floor 18 which provides an upper surface for the ramp and over which moves the upper run of an endless conveyor 20. This conveyor may be of any conventional construction, such as one that includes a pair of transversely spaced apart chains (one of which is clearly visible in FIG. 3) mounted over sprockets, such as at 19, and cross-connected by a plurality of flights or slats 21. Shafts 22 and 23 respectively at the receiving and discharge ends 14 and 15 of the trough carry the conveyor. The conveyor may be driven in any suitable manner. In the present case, an internal combustion engine 24 is indicated as the source of power.

The improvement lies generally in the provision of a guide above the trough 17. The guide comprises a rear or first rigid elongated section 30 and a forward or second rigid elongated section 31. The guide extends between a forward U-shaped support 32 at the bale-receiving end of the elevator and a rear U-shaped support 33 at the rear or bale-discharge end of the elevator. Intermediate the supports 32, 33 is a pair of intermediate supports 34, 35. Opposite legs of the U-shaped members 32–35 depend on opposite sides of and are connected to the side walls 16, 17 of the elevator trough 13. The bight portions of the U-shaped supports 32–35 overlie the trough and serve as direct support for the sections 30, 31. The rear or first section 30 is held generally against fore-and-aft movement by means of struts 36, 37 which extend between the legs of the U-shaped member 34 and the side walls 16, 17 respectively. The forward section 31 is pivoted about a pivot point or pin 38 at its rear end and is therefore pivoted relative to the rear section 30. The forward section 31 of the guide extends or projects forwardly from the front support 32 and is pivotally connected to the support 32 by means of a link 40 pivoted at opposite ends to the guide section 31 and bight portion of the U-shaped member 32. Extending downwardly from the bight portion is a shaft 41 which is fixed to a transverse pivot pin 42 pivoted at opposite ends to a pair of brackets 43, 44 fixed to opposite sides of the guide section 31. The U-shaped support 32 is pivoted as at 45, to swing fore and aft relative to the trough on the side walls 16, 17 and consequently, through the pivots 45, and the pivotal connection of the link 40 to the guide section 31 and support 32, the section 31 is free to move vertically about its rear end or pivot 38. A spring surrounds the rod 41 and normally biases the guide section 31 to a height substantially the width of a bale from the floor 18 in the trough 13. The purpose of supporting the forward section 31 in the manner described is to permit some vertical flexibility at the forward end of the guide section. Should a bale be dumped from a wagon and started in the elevator in a standing position, the forward end of the guide would compress the spring 46 to permit the bale to enter the trough until it may be tumbled to its side.

The guide section 31 is composed of a pair of rigid elongated U-shaped members opening upwardly with the upper member fitting into and spaced from the lower member 51 to provide an opening or space 53 between the two members. The two channel members 50, 51 are rigidly held together in any suitable manner. The construction of the upper or first section 30 is identical to that of the lower section 31 and will therefore not be set forth in detail.

At the bale discharge end 15 of the elevator there is provided a pair of upright longitudinally extending panels 55, 56 fixed at their lower ends to the side walls 16, 17. The panels 55, 56 are flanged at their upper edges and are interconnected by means of a transverse plate or panel 57. Fixed to the outer surface of the panel 55 is a bracket 58 which supports at its outer end a reversing idler sprocket 59. The bracket 58 is provided with suitable slots for permitting take-up in a chain drive presently to be described. The panels 55, 56 also support a transverse sprocket shaft 60, the outer end of which has a chain sprocket 61 pinned thereto. Fixed to the transverse conveyor shaft 23 is a chain sprocket 62. Mounted over the sprockets 59, 61, 62 is a chain 63. The sprockets 61, 62 are of the same size and consequently the shafts 23, 60 will have the same rate of rotation. The shaft 60 supports a second sprocket 64 centrally between the panels 55, 56.

At the lower end of the lower guide section 31 is a pair of inwardly turned brackets 70, 71 which support a transverse sprocket shaft 72. Fixed to the shaft 72 is a chain sprocket 73 which is positioned centrally relative to the brackets 70, 71. Also mounted on the transverse shaft 72 outwardly of the channel members 50, 51 is a pair of rotating wheels 74, 75 having radially extending bale-engaging fingers 76, 77 respectively. The wheels 74, 75 are provided with hubs, such as is shown at 78, to space the wheels transversely and outwardly of the guide section 31.

Mounted over and extending between the sprockets 64, 73 is a continuous chain 80 with an upper run 80a disposed above the guide sections 30, 31 and riding in the upwardly opening channel member 50, and a lower run 80b disposed in catenary fashion from the sprockets 64, 73 and receiving backing support from the transverse laterally disposed section of the channel member 51. The chain 80 is provided with longitudinally spaced and vertically extending lugs 81. The lugs 81 are transversely spaced apart so as to ride on opposite sides of the sprockets 64, 73 and obviously not interfere with the sprocket teeth as they pass over the sprockets. Adjacent the lower end of the guide section 31 is an idler sprocket 85 which is supported by brackets 86, 87 on the vertical wall portions of the inner channel member 50. Also at the upper end of the upper section 30 is an idler sprocket 88 which is bracketed, as at 89, to the section 30. The sprockets 85, 88 maintain the chain 80 between the vertical walls of the channel member 50.

The invention operates in the following manner. Upon bales being received in the lower end of the elevator, they will first contact the driven wheels 74, 75. The fingers 76, 77 will tend to bite into the bales and begin the movement of the bales on the lower or floor conveyor 20. Should the bales enter endwise, the wheels 74, 75 will tend to tumble the bales into a position lengthwise of the trough.

Following the bales entering into the trough, they will normally be driven upwardly by the conveyor 20. However, if for any reason they would tend to tumble down the trough, the guide sections 30, 31 and the lower chain run 80b will engage the bales and will drive the upper surface of the bales at substantially the same rate of movement as they are driven by the conveyor 20. It is for the purpose of driving the chain 80 at the same speed as the conveyor 20 that the sprockets 61, 62 are the same size as well as the sprockets 19 of the conveyor 20 and the sprocket 64. The power for operating the upper chains 80 is received from the power source 24 through the chains of the floor conveyor 20 and the chain 63. Since the forward drive section 31 projects forwardly of the support 32, the forward end of the support is clear to receive the bales. By having the drive connection between the chain 80 and the floor conveyor 20 at the upper end of the elevator, there is created a measure of safety since the direct driving connection is spaced from the location where men may be working. Also, by so placing the drive, it will not interfere or will not be contacted by the bales tumbling from, for example, a truck or wagon unloading the elevator hopper.

While only one form of the invention has been shown, it should be recognized that other forms and variations will occur to those skilled in the art. Therefore, it should be understood that while the present form was shown and described in detail for the purpose of clearly and concisely illustrating the principles of the invention, it was not the intention to so limit or narrow the invention beyond the broad concept set forth in the appended claims.

What is claimed is:

1. In an elevator for handling bales of the type having a length substantially greater than their width, the elevator including a trough inclined from a lower bale-receiving end to an upper bale-discharge end and advancing means of the continuous conveyor type having a conveyor run movable lengthwise of the trough to move bales from the receiving end to the discharge end, said conveyor being mounted over transverse shafts at the bale-receiving and bale-discharge ends respectively, the improvement comprising: longitudinally spaced support means mounted on the trough including a support at the discharge end of the trough, a support at the receiving end of the trough, and a support intermediate the ends of the trough, each of said supports having portions thereof positioned above the trough; bale guide means above the trough mounted on said portions of the supports including a first elongated rigid section extending between and supported by the intermediate support and discharge-end support substantially at a height from the trough equivalent to the width of the bale, and a second rigid elongated section continuing downwardly from and mounted in pivotal relation to the end of the first section and carried on and extending beyond the receiving-end support; means biasing the first section downwardly to a position engageable with bales passing between the trough and the second section and effective to permit the second section at its lower end to rise above the trough to permit a bale standing lengthwise in the trough to pass beneath the lower end; a transverse sprocket shaft mounted adjacent the lower end of the second section and extending outwardly from the lower section; a transverse sprocket shaft mounted adjacent the upper end of the first section; sprockets mounted on the sprocket shafts; continuous chain means mounted over the sprockets having an upper run disposed above and riding on said guide sections and a lower run engageable with the top side of bales disposed beneath the guide sections for receiving backing support from the guide sections; vertical lugs extending outwardly from the chain means for aggressively engaging the bales; transverse rotor means mounted on the lower transverse sprocket shaft including radial bale-engaging fingers; and drive means extending from the transverse conveyor shaft at the bale-discharge end of the elevator to the transverse sprocket shaft adjacent the upper end of the first section.

2. In an elevator for handling bales of the type having a length substantially greater than their width, the elevator including a trough inclined from a lower bale-receiving end to an upper bale-discharge end and advancing means of the continuous conveyor type having a conveyor run movable lengthwise of the trough to move bales from the receiving end to the discharge end, said conveyor being mounted over transverse shafts at the bale-receiving and bale-discharge ends respectively, the improvement comprising: longitudinally spaced support means mounted on the trough including a support at the discharge end of the trough, a support at the receiving end of the trough, and a support intermediate the ends of the trough, each of said supports having portions thereof positioned above the trough; bale guide means above the trough mounted on said portions of the supports including a first elongated rigid section extending between and supported by the intermediate support and discharge-end support substantially at a height from the trough equivalent to the width of the bale, and a second rigid elongated section continuing downwardly from and mounted in pivotal relation to the end of the first section and carried on and extending beyond the receiving-end support; means biasing the first section downwardly to a position engageable with bales passing between the trough and the second section and effective to permit the second section at its lower end to rise above the trough to permit a bale standing lengthwise in the trough to pass beneath the lower end; a transverse sprocket shaft mounted adjacent the lower end of the second section; a transverse sprocket shaft mounted adjacent the upper end of the first section; sprockets mounted on the sprocket shafts; continuous chain means mounted over the sprockets having an upper run disposed above and riding on said guide sections and a lower run engageable with the top side of bales disposed beneath the guide sections for receiving backing support from the guide sections; vertical lugs extending outwardly from the chain means for aggressively engaging the bales; and drive means extending from the transverse conveyor shaft at the bale-discharge end of the elevator to the transverse sprocket shaft adjacent the upper end of the first section.

3. In an elevator for handling bales including a trough inclined from a lower bale-receiving end to an upper bale-discharge end and advancing means of the continuous conveyor type having a conveyor run movable lengthwise of the trough to move bales from the receiving end to the discharge end, said conveyor being mounted over transverse shafts at the bale-receiving and bale-discharge ends respectively, the improvement comprising: longitudinally spaced support means mounted on the trough including a support at the discharge end of the trough and a support at the receiving end of the trough, each of said supports having portions thereof positioned above the trough; bale guide means above the trough mounted on said portions of the supports substantially at a height from the trough equivalent to the width of the bale with the lower end of the bale-guide means extending beyond the receiving-end support; means biasing the lower end of the guide means downwardly to a position engageable with bales passing between the trough and the lower end and effective to permit the lower end to rise above the trough to permit a bale standing lengthwise in the trough to pass beneath the lower end; a transverse sprocket shaft mounted adjacent the lower end; a transverse sprocket shaft mounted adjacent the upper end of the guide means; sprockets mounted on the sprocket shafts; continuous chain means mounted over the sprockets having an upper run disposed above and riding on said guide means and a lower run engageable with the top side of bales disposed beneath the guide means and receiving backing support from the guide means; vertical lugs extending outwardly from the chain means for aggressively engaging the bales; and drive means extending from the transverse conveyor shaft at the bale-discharge end of the elevator to the transverse sprocket shaft adjacent the upper end of the guide means.

4. In an elevator for handling bales including a trough inclined from a lower bale-receiving end to an upper bale-discharge end and advancing means of the continuous conveyor type having a conveyor run movable lengthwise of the trough to move bales from the receiving end to the discharge end, said conveyor being mounted over transverse shafts at the bale-receiving and bale-discharge ends respectively, the improvement comprising: longitudinally spaced support means mounted on the trough; an elongated and substantially rigid bale guide means mounted on the support means substantially at a height from the trough equivalent to the width of the bale; means biasing the lower end of the guide means downwardly to a position engageable with bales passing between the trough and the lower end and effective to permit the lower end to rise above the trough to permit a bale standing lengthwise in the trough to pass beneath the lower end; a transverse sprocket shaft mounted adjacent the lower end; a transverse sprocket shaft mounted adjacent the upper end of the guide means; sprockets mounted on the sprocket shafts; continuous chain means mounted over the sprockets having an upper run disposed above and riding on said guide means and a lower run engageable with the top side of bales disposed beneath the guide means and receiving backing support from the guide means; and drive means extending from the transverse conveyor shaft at the bale-discharge end of the elevator to the transverse sprocket shaft adjacent the upper end of the guide means.

5. In an elevator for handling bales including a trough inclined from a lower bale-receiving end to an upper bale-discharge end and advancing means of the continuous conveyor type having a conveyor run movable lengthwise of the trough to move bales from the receiving end to the discharge end, said conveyor being mounted over transverse shafts at the bale-receiving and bale-discharge ends respectively, the improvement comprising: longitudinally spaced support means mounted on the trough; an elongated and substantially rigid bale guide means mounted on the support means substantially at a height from the trough equivalent to the width of the bale; a transverse sprocket shaft mounted adjacent the lower end of the guide means; a transverse sprocket shaft mounted adjacent the upper end of the guide means; sprockets mounted on the sprocket shafts; continuous chain means mounted over the sprockets having an upper run disposed above and riding on said guide means and a lower run engageable with the top side of bales disposed beneath the guide means and receiving backing support from the guide means; and drive means extending from the transverse conveyor shaft at the bale-discharge end of the elevator to the transverse sprocket shaft adjacent the upper end of the guide means.

6. In an elevator for handling bales including a trough inclined from a lower bale-receiving end to an upper bale-discharge end and advancing means of the continuous conveyor type having a conveyor run movable lengthwise of the trough to move bales from the receiving end to the discharge end, said conveyor being mounted over transverse shafts at the bale-receiving and bale-discharge ends respectively, the improvement comprising: longitudinally spaced support means mounted on the trough; elongated and substantially rigid bale guide means mounted on the support means substantially at a height from the trough equivalent to the width of the bale; longitudinally spaced transverse sprocket shafts mounted on the guide means; sprockets mounted on the sprocket shafts; continuous chain means mounted over the sprockets having an upper run disposed above the guide means and a lower run engageable with the top side of bales disposed beneath the guide means and receiving backing support from the guide means; and drive means extending from one of the transverse conveyor shafts of the elevator to one of the transverse sprocket shafts.

7. In an elevator for handling bales including a trough inclined from a lower bale-receiving end to an upper bale-discharge end and advancing means of the continuous conveyor type having a conveyor run movable lengthwise of the trough to move bales from the receiving end to the discharge end, said conveyor being mounted over transverse shafts at the bale-receiving and bale-discharge ends respectively, the improvement comprising: longitudinally spaced support means mounted on the trough; an elongated and substantially rigid bale guide means mounted on the support means substantially at a height from the trough equivalent to the width of the bale; longitudinally spaced transverse sprocket shafts mounted on the guide means; sprockets mounted on the sprocket shafts; continuous chain means mounted over the sprockets having an upper run disposed above the guide means and a lower run engageable with the top side of bales disposed beneath the guide means and receiving backing support from the guide means; transverse rotor means mounted on the guide means adjacent the lower of the transverse sprocket shafts and including radial bale-engaging fingers; and drive means extending from one of the transverse conveyor shafts of the elevator to one of the transverse sprocket shafts.

8. The invention defined in claim 7 further characterized by the lower of the transverse sprocket shafts extending outwardly from the guide means, and the rotor means includes a pair of axially spaced wheels on opposite ends of the lower shaft.

9. The invention defined in claim 6 further characterized by the drive means extending from one of the transverse conveyor shafts to one of the transverse sprocket shafts is in the form of a pair of similarly-sized sprockets on each of the respective shafts and an endless chain extending over the sprockets to effect movement of the chain means on the guide means at a rate of movement equal to the rate of movement of the conveyor.

10. The invention defined in claim 6 further characterized by said chain means having lugs extending downwardly to engage the bales moving on the conveyor.

References Cited in the file of this patent

UNITED STATES PATENTS

| | | |
|---|---|---|
| 986,717 | Johnson | Mar. 14, 1911 |
| 1,707,725 | Jantz | Apr. 2, 1929 |
| 2,367,970 | Smoker | Jan. 23, 1945 |
| 2,507,627 | Friedrich | May 16, 1950 |
| 2,586,324 | Graves | Feb. 19, 1952 |